Patented Feb. 6, 1923.

1,444,469

UNITED STATES PATENT OFFICE.

GUSTAV KÖGEL, OF KARLSRUHE, AND HEINRICH NEUENHAUS, OF BIEBRICH, GERMANY, ASSIGNORS TO THE FIRM OF KALLE & CO. AKTIENGESELL-SCHAFT, OF BIEBRICH-ON-THE-RHINE, GERMANY.

MANUFACTURE OF LIGHT COPY PAPER.

No Drawing. Application filed September 12, 1922. Serial No. 587,857.

*To all whom it may concern:*

Be it known that we GUSTAV KÖGEL, of Karlsruhe, Germany, and HEINRICH NEUENHAUS, of Biebrich, Germany, have invented certain new and useful Improvements in the Manufacture of Light Copy Paper (for which we have filed applications in Germany, K. 64199 VI/57b, dated May 31, 1917; K. 73780 VI/57b, dated July 12, 1920; K. 75371 VI/57b, dated Nov. 29, 1920; K. 78586 VI/57b, dated July 30, 1921; K. 79387 VI/57b, dated Oct. 5, 1921; K. 82049 VI/57b, dated May 19, 1922; and in Switzerland, G. 9861, dated Dec. 16, 1920), of which the following is a specification.

The object of the invention is a process for the production of a light sensitive film on a suitable carrier. It is possible to apply it equally as well for copying purposes as for the preparation of photographic pictures. For the preparation of the so-called blue print paper the so-called iron process is generally used to produce not only a negative but also a positive paper. Already certain diazo compounds are used for the production of light sensitive copying paper or photographic paper. The papers so produced are either not specially sensitive to light or not sufficiently stable on account of the easy decomposition of the diazo compounds which are used.

It has now been discovered that the so-called diazoanhydrides are particularly suitable for the production of copies of photographs on account on the one hand of possessing a high degree of light sensitiveness whilst on the other hand they are very stable.

The diazoanhydrides coming chiefly into consideration are the sulphoacids of naphthalene-1.2 or 2.1-diazooxide or their derivatives, preferably their halogen or nitro derivatives. The papers can be very simply prepared by painting them with the solution for example of 1-diazo-2-oxy-naphthalene-4-sulphonic acid. If material such as paper, glass, films, etc., is prepared with such a layer and exposed to light under a photographic negative plate the diazo-body where exposed to the light is destroyed and can no longer couple with azo colour components. The complete decomposition is recognized by the complete bleaching of the yellow coloured diazo body. Those parts of the picture which are not transparent give incomplete or no access to the light and in consequence the thus protected diazo anhydride remains free to couple with azo colour components. If therefore a layer exposed to light in such a manner is put into a bath of an azo colour component with a slight addition of alkali the protected or non exposed parts will couple and form an azo colour. By this method a positive picture is produced immediately. If for example resorcinol is used as a coupling component beautiful red shades are produced.

It has been further shown that it is not necessary for the coupling with the azo colour component to be effected after the exposure of the layer. Without spoiling the effect or picture the azo colour component may be incorporated with the diazoanhydride on the carrier. Thus the diazoanhydride can be applied together with, for example resorcinol, phlorglucinol or methyl-phenylpyrazolon in about molecular proportions. To obtain still greater stability of the light-sensitive layer small additions of acid such as tartaric or citric acid are made. If a layer so prepared is put under a picture to be copied and then exposed to light the picture can be reproduced by either treating the layer with a solution of alkali in water, e. g., sodium hyrdrate, sodium carbonate, calcium hydrate or ammonia or if convenient simply exposed to an atmosphere of ammonia as in ordinary cases to the fumes of an ammonia bottle. In this last instance an intense picture is produced without the application of any liquids. The development of the picture can also be effected in other ways.

As already pointed out the diazo oxides are destroyed by the action of light but before complete destruction has taken place a body is joined which possibly contains a further hydroxyl group and which at all events will couple with the unaltered diazo body. If consequently the light-sensitive layer is prepared from a diazoanhydride only, without any addition of an azo colour component and exposed under a positive until the diazo oxide exposed, fades away and the layer is afterwards again exposed to light for a short time after having removed the positive picture, the diazo compound still remaining on the unexposed portions will couple with the azocolour component formed by the short after-exposure from the diazooxide and a positive picture is then obtained by the action of alkali.

Similar pictures can also be obtained, without after exposure in such a manner that the copy is developed in sunlight or even electric light, by the use of alakali.

With the assistance of the above referred to bodies a positive picture can also be produced from a negative. This is effected by applying an acid absorbing product with the diazoanhydrides in the light-sensitive layer e. g. the diazo oxide layer is put into a solution of an alkali or acetate (catalyst) then dried before the exposure to light. If now exposed under a negative the transparent parts will at once shew a positive picture owing to the portion of the diazo body destroyed by the light being transformed into an azo colour component and with the acid of the alkali coupling at once with the unaltered portion of the diazo body. By washing the light sensitive layer the unexposed portions of the diazo bodies are removed and the picture is fixed.

For this process diazo bodies which are not completely bleached by the light may also be used.

From the light-sensitive layer prepared by the previously described process negative pictures as well as positive ones can be obtained.

Apart from the use of alkali, if a mordant such as tartar emetic be added to the diazoanhydride a layer is formed which is twice as sensitive to light as silver chlorid. The colour picture thus obtained can be shaded with e. g. bicromate, oxydizing product and such like and these bodies may be incorporated in the layer.

With this light-sensitive paper negative copies can also be obtained from positives if the light sensitized paper is placed on the positive and exposed to the light. For this purpose the paper carrying the layer must be transparent or it may be replaced by films.

Pictures may further be obtained from the diazooxides without any further addition or treatment, by merely exposing the carrier of the layer under a copy then reexposing for a short time and finally storing the picture for some time in the dark, i. e., a drawer. Gradually, the parts which were only partly decomposed through being covered by the lines of the drawing to be copied, develop into a colouring and thus produce a positive from a positive.

The pictures obtained by the above mentioned method are quite good for ordinary purposes. They are however sensitive to water and bleed in the rain. In order to produce pictures fast to water, metal salts and particularly those of copper, nickel, iron, manganese or mercury are introduced into the picture layer. By this addition a considerable resistance to water is obtained, in fact absolute resistance from a practical point of view. The metal salts apparently form the metal compounds of the diazooxides or of the dyestuffs. These metal salts may be applied either together with the diazooxides or the colour components in the same solution or they may be applied separately on the carrier of the layer or further, they can be added to the developing bath by themselves or together with the dyestuff component with a later addition of alkali. The fastness to light of such pictures is also considerably improved by the addition of such salts, particularly the copper and nickel salts. The shades or tones of the pictures differ according to the various metal salts so that different shades can be produced. For example from the chlorinated 1-diazo-2-oxynaphthalene-4-sulphonic acid and resorcinol with zinc and aluminium salts very pure red shades are obtained, with calcium salts bluish red, with iron salts brownish, with manganese salts blackish blue and with copper salts reddish violet tones are obtained.

For the development of the pictures in the aqueous alkaline bath, diluted ammonia solution, lime water, etc., are the most suitable. Further, it has been found that the presence of calcium salts and particularly the chlorid produce a more intense development of the photos whether developed in ammonia gas or in the aqueous baths.

Examples.

1. Suitable paper is painted with a solution of 2.5 gr. 1 diazo-2-naptholene-4-sulphonic acid in 1 litre water. After it is dried the paper is ready for use and remains durable. After the exposure under a positive the paper is put into an alkali solution of resorcinal which thus produces a positive violet photograph or picture.

In the same manner other diazoanhydrides can be used e. g. 2.1-diazooxy-3.6-naphthhalene trisulphonic acid, the m-bis-diazo-p-diphenol (ber. d. d. chem. Ges. 21 S. 3333 Tetrazodiphenol Ber. 21, S. 3333 or the Indazoltriazol Ber. 32, S. 1779 and Ber. 21, S. 3333).

2. 1-diazo-2-oxynaphthalene-4-sulphonic acid is added with tartar emetic and sodium hydrate to the emulsion and the paper or films rendered sensitive to light thereby. The diazo paper can also be immediately treated before use with alkali. After the exposure the picture is washed in diluted sodium hydrate solution.

3. 20 parts by weight 1-diazo-2-oxynaphthalene-4-sulphonic acid and 5 parts by weight tartaric acid are dissolved in 800 parts water and added to a solution of 10 parts by weight of resorcinol dissolved in 200 parts water. With this solution the paper is painted in the usual way and dried.

In the place of resorcinol the equivalent quantities of phloroglucinol, phenylmethyl pyrazolon or similar azo colour components may be used and in the place of tartaric acid, citric acid or similar bodies may be used.

4. 20 parts by weight chlorinated 1-diazo-2-oxynaphthalene-4-sulphonic acid and 10 parts by weight resorcinol are dissolved in 700 parts by weight water to which is added a solution of 60 parts (by weight) cupric sulfate in 300 parts water.

5. 20 parts by weight chlorinated 1-diazo-2-oxynaphthalene-4-sulphonic acid and 15 parts by weight phloroglucinol are dissolved in 700 parts (weight) water to which a solution of 60 parts (by weight) cupric chloride and 75 parts by weight calcium chloride in 300 parts water is added.

6. 17 parts by weight 1-diazo-2-oxynaphthalene-4-sulphonic acid and 10 parts by weight resorcinol are dissolved in 700 parts water to which is also added a solution of 50 parts by weight nickel sulphate in 300 parts water.

7. 20 parts by weight chlorinated 1-diazo-2-oxynaphthalene-4-sulphonic acid and 10 parts by weight resorcinol in 700 parts by weight water and added to a solution of 60 parts by weight manganese chloride dissolved in 300 parts water.

With these solutions the carrier is painted in the usual manner. After the light exposure the picture is developed in an aqueous alkaline solution, e. g. in lime water or ammonia (of 5–10%NH₃ contents) or by exposure to an atmosphere of ammonia gas.

8. 17 parts by weight 1-diazo-2-oxynaphthalene-4-sulphonic acid and 10 parts by weight resorcinol are dissolved in 1000 parts water. The paper or similar materials painted with this solution are treated after the exposure in a lime water bath or 5–10% ammonia water for development, rinsed and then treated in a further bath of 5 parts by weight nickel sulphate in 100 parts water and rinsed again. Or the copies may be developed in an ammoniacal solution of copper bath in the following manner.

2 parts by weight cupric sulphate are dissolved in 80 parts by weight water to which 20 parts by weight conc. ammonia water are added. The material is then washed.

9. 20 parts by weight chlorinated 1-diazo-2-oxynaphthalene-4-sulphonic acid are dissolved in 1000 parts water.

Paper and similar material painted with this solution are after the copying, developed in a bath composed of a solution of 2.5 parts by weight resorcinol and 5 parts by weight cupric sulphate dissolved in 80 parts water to which 20 parts by weight conc. ammonia are added. After the development the copies are washed. The development may also be effected on a bath containing 2.5 parts by weight resorcinol, 20 parts by weight conc. ammonia and 80 parts water, the material is then washed and then the copies are treated in a bath of 5 parts by weight cupric sulphate dissolved in 100 parts water after which the copies are washed again.

We claim:

1. Process for producing layers sensitive to light on a suitable base, consisting in covering the base with diazoanhydrides bleaching on the exposure to light.

2. Process for producing sensitive layers on a suitable base, consisting in covering the base with a bleaching diazoanhydride and an alkali.

3. Process for producing sensitive layers on a suitable base, consisting in covering the base with a bleaching diazoanhydride, an alkali and a mordant.

4. Process for producing sensitive layers on a suitable base, consisting in covering the base with a bleaching diazoanhydride and a metal salt.

5. Process for producing sensitive layers on a suitable base, consisting in covering the base with a bleaching diazoanhydride, an azodyestuff component and a metal salt.

6. Process for producing sensitive layers on a suitable base, consisting in covering the base with a bleaching diazoanhydride, an alkali and a metal salt.

7. As new products sensitive layers on a suitable base, consisting of bleaching diazoanhydrides.

8. As new products sensitive layers on a suitable base consisting of bleaching diazoanhydrides and an alkali.

9. As new products sensitive layers on a suitable base consisting of bleaching diazoanhydrides and a mordant.

10. As new products sensitive layers on a suitable base consisting of bleaching diazoanhydrides and a metal-salt.

11. As new products sensitive layers on a suitable base consisting of bleaching diazoanhydrides, an azodyestuff component and a metal-salt.

12. As new products sensitive layers on a suitable base consisting of bleaching diazoanhydrides, an alkali and a metal-salt.

In testimony whereof we affix our signature in presence of two witnesses.

Prof. Dr. Ing. GUSTAV KÖGEL.
Dr. Phil. HEINRICH NEUENHAUS.

Witnesses:
F. H. ANDERSON,
BASIL E. SAVARD.